(12) United States Patent
Yang

(10) Patent No.: US 8,290,364 B2
(45) Date of Patent: Oct. 16, 2012

(54) METHOD, OPTICAL NETWORK AND NETWORK DEVICE FOR LOCATING FIBER EVENTS

(75) Inventor: Sulin Yang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 797 days.

(21) Appl. No.: 12/332,854

(22) Filed: Dec. 11, 2008

(65) Prior Publication Data

US 2009/0092388 A1     Apr. 9, 2009

(51) Int. Cl.
H04B 10/08     (2006.01)
H04B 17/00     (2006.01)

(52) U.S. Cl. ............... 398/20; 398/10; 398/33

(58) Field of Classification Search ............ 398/20, 398/10, 33
See application file for complete search history.

(56) References Cited

U.S. PATENT DOCUMENTS

| | | | |
|---|---|---|---|
| 6,028,661 A * | 2/2000 | Minami et al. | 356/73.1 |
| 6,108,112 A * | 8/2000 | Touma | 398/10 |
| 6,310,702 B1 * | 10/2001 | Minami et al. | 398/13 |
| 6,396,575 B1 * | 5/2002 | Holland | 356/73.1 |
| 6,490,063 B1 | 12/2002 | Imajo | 398/13 |
| 6,534,997 B1 * | 3/2003 | Horishita et al. | 324/534 |
| 6,650,840 B2 * | 11/2003 | Feldman | 398/21 |
| 7,035,202 B2 | 4/2006 | Callon | |
| 7,386,234 B2 * | 6/2008 | Lee et al. | 398/67 |
| 7,684,702 B2 * | 3/2010 | Lu | 398/67 |
| 7,881,607 B2 * | 2/2011 | DeLew et al. | 398/17 |
| 2004/0090663 A1 | 5/2004 | Kamada et al. | |
| 2004/0156635 A1 | 8/2004 | Felske et al. | |
| 2005/0019031 A1 * | 1/2005 | Ye et al. | 398/19 |
| 2005/0111843 A1 | 5/2005 | Takeuchi et al. | |
| 2006/0007426 A1 | 1/2006 | Weller | |
| 2006/0029390 A1 * | 2/2006 | Schmuck et al. | 398/33 |
| 2006/0153562 A1 | 7/2006 | Dolbec et al. | |
| 2006/0222364 A1 | 10/2006 | Chung et al. | |
| 2007/0103670 A1 * | 5/2007 | Sezerman et al. | 356/73.1 |
| 2008/0292312 A1 * | 11/2008 | Oron et al. | 398/33 |

FOREIGN PATENT DOCUMENTS

CN     1138358 C     2/2004

(Continued)

OTHER PUBLICATIONS

S.B Park, Optical fault monitoring method using broadband light source in WDM-PON, Feb. 16, 2006, Electronic letters vol. 42, No. 4.*

The Fiber optic Association-Tech topic, The fibe roptic association Inc., 2004.*

Written Opinion of the International Searching Authority issued in corresponding PCT Application No. PCT/CN2008/070144; mailed Apr. 30, 2008.

(Continued)

*Primary Examiner* — Kenneth N Vanderpuye
*Assistant Examiner* — Amritbir Sandhu
(74) *Attorney, Agent, or Firm* — Brinks Hofer Gilson & Lione

(57) ABSTRACT

A method for locating fiber events and an optical network and network device are provided. The method for locating fiber events includes: determining the distance between an event and an OLT, measuring the optical loss of the optical channel between the OLT and an ONU or ONT at the peer end of the measured fiber link, and, according to the measured optical loss of the optical channel, judging whether the event occurs on the measured fiber link, and if so, determining the location of the event on the measured fiber link according to the distance between the event and the OLT.

4 Claims, 5 Drawing Sheets

FOREIGN PATENT DOCUMENTS

| | | |
|---|---|---|
| CN | 1505284 A | 6/2004 |
| CN | 1556384 A | 12/2004 |
| CN | 1665173 A | 9/2005 |
| CN | 1731709 A | 2/2006 |
| CN | 1863104 A | 11/2006 |
| CN | 1866791 A | 11/2006 |
| CN | 101232328 A | 7/2008 |
| EP | 1 098 458 A2 | 5/2001 |
| EP | 1 309 097 A1 | 5/2003 |
| EP | 1 315 318 A1 | 5/2003 |
| GB | 2 274 753 A | 8/1994 |
| JP | 10-327104 A | 12/1998 |
| JP | 2005-337804 A | 12/2005 |
| WO | WO 2004/010612 A1 | 1/2004 |

OTHER PUBLICATIONS

Office Action issued in corresponding European Patent Application No. 08 700 801.7; issued Jul. 22, 2009.

Office Action issued in corresponding European Patent Application No. 08 700 801.7; issued Dec. 21, 2009.

International Search Report issued in corresponding PCT Patent Application No. PCT/CN2009/070310, mailed Apr. 23, 2009.

Enomoto et al., Over 31.5dB Dynamic Range Optical Fiber Line Testing System with Optical Fiber Fault Isolation Function for 21-Branched PON. OFC 2003.

Office Action issued in corresponding European Patent Application No. 08700801.7; issued Jul. 3, 2009.

* cited by examiner

METHOD, OPTICAL NETWORK AND NETWORK DEVICE FOR LOCATING FIBER EVENTS

This application claims priority to Chinese Patent Application No. 200710006066.1, filed with the Chinese Patent Office on Jan. 26, 2007 and entitled "Method for Locating Events of Branch Fibers, Optical Network and Network Device" and china PCT/CN2008/07014401/2008 the contents of Which are incorporated herein by reference in their entirety.

1. Field of the Disclosure

The present embodiments relate to the communication field, and in particular, to a method for locating events of a fiber, an optical network, and a network device.

2. Background of the Disclosure

Currently, optical access is booming, especially, the point-to-multipoint optical access Technology—Passive Optical Network (PON), which attracts the attention of people. The representative PON technologies are Gigabit Passive Optical Network (GPON) and Ethernet Passive Optical Network (EPON). The GPON technology features high line rate and mature maintenance functions, and is therefore widely applied.

In the operation process of the PON system, the measurement of optical transmission features is an important item of PON system maintenance. Through monitoring over fiber lines, the fiber lines can be monitored in an automatic, continuous, online and remote way. It can realize fast response to faults to maintain the fiber lines of the PON system periodically and identify faults remotely, so that fast protection switching can be realized at the bottom layer before upper-layer networks are affected.

Optical Time Domain Reflectometers (OTDR) and Optical Frequency-Domain Reflectometers (OFDR) are devices for measuring transmission features of fibers. An OTDR provides details of attenuation distributed along the length of a fiber, including detection, location, and measurement on an event in any position on the fiber link. An event refers to a defect caused by splicing, connectors, conversion connectors, jumpers, bending or breakage on a fiber link. The change of the optical transmission features caused by defects may be measured by an OTDR. An OTDR may locate an event according to the measured change of optical transmission features. The OTDR sends a test signal, monitors the strength and delay of the signal reflected from the event position after the test signal arrives at the event position, and determines the type and location of the event accordingly. Unlike an OTDR, an OFDR uses frequency parameters for measurement.

However, in the point-to-point network topology of a PON, the test signals sent from the fiber detection device such as OTDR and OFDR at the Optical Line Terminal (OLT) side are reflected by branch fibers and are overlaid together. The fiber detection device such as OTDR and OFDR cannot identify the branch fiber where the event is located.

Two prior art methods exist for monitoring fiber lines. The first monitoring method involves adding a reflector to the end of each branch fiber to reflect the test signals. In order to avoid overlapping of the waveforms of the reflected light at the end of each branch fiber, the lengths of the branch fibers must be different in the PON networking. In the test, the branch fiber may be monitored by monitoring the waveform of each branch fiber.

In the second method, the PON network fibers are monitored at Optical Network Unit (ONU) or Optical Network Terminal (ONT) side. A fiber detection device (OTDR or OFDR) is integrated on each ONU or ONT, and the fiber detection device on each ONU or ONT monitors the branch fibers and backbone fibers on the ONU or ONT at intervals. The test data or results are uploaded to the OLT through an uplink channel. The method solves the problem that the fiber detection device such as OTDR or OFDR at the OLT side is unable to locate the event on the specific branch fiber. This technical solution makes it easy to locate the event on a fiber branch or backbone fiber. However, because the fiber detection devices or functions such as OTDR and OFDR are very expensive, the cost of network monitoring is very high if a fiber detection device such as OTDR and OFDR is deployed on every ONU or ONT of the PON network terminal.

Moreover, test results are valuable only when they are transferred to the OLT side of the central office, and the test is still invalid if the OLT is unable to receive the test data or test results normally due to disconnection of lines or too large attenuation.

SUMMARY OF THE DISCLOSURE

The present embodiments provide a method for locating fiber events, an optical network, and a network device so that an event can be located at the OLT side even if the event occurs on the branch fiber.

A method for locating fiber events in one of the one of embodiments includes: determining the distance between an event and an OLT; measuring optical loss of an optical channel between the OLT and an ONU or ONT at the peer end of the measured fiber link; according to the measured optical loss of the optical channel, judging whether the event occurs on the measured fiber link; and if so, determining the location of the event on the measured fiber link according to the distance between the event and the OLT.

An optical network provided in one of the embodiments includes: an optical loss measuring unit, adapted to measure optical loss of an optical channel between an OLT and an ONU or ONT at the peer end of a measured fiber link; a judging unit, adapted to determine whether an event occurs on the measured fiber link according to the optical loss of the optical channel measured by the optical loss measuring unit; an event location determining unit, adapted to determine the distance between the event and the OLT, and, if the judging unit determines that the event occurs on the measured fiber link, determine the location of the event on the measured fiber link according to the distance between the event and the OLT.

A network device provided in one of the embodiments is an OLT, which includes: an optical loss measuring unit, adapted to measure optical loss of an optical channel between an OLT and an ONU or ONT at the peer end of a measured fiber link; a judging unit, adapted to determine whether an event occurs on the measured fiber link according to the optical loss of the optical channel measured by the optical loss measuring unit; an event location determining unit, adapted to determine the distance between the event and the OLT, and, if the judging unit determines that the event occurs on the measured fiber link, determine the location of the event on the measured fiber link according to the distance between the event and the OLT.

A network device provided in one of the embodiments is an ONU or ONT, which includes a reflecting apparatus, adapted to reflect a received test signal back to the transmit end of the test signal in the direction against the test signal sending when the reflecting apparatus is powered on, and not reflect the received test signal back to the transmit end of the test signal when the reflecting apparatus is powered off.

A network device provided in one of the embodiments is an ONU or ONT which includes: a energy measuring unit, adapted to measure the energy of a test signal, which includes the energy of the test signal sent at the local end and the energy of the test signal received from the peer OLT, and a sending unit, adapted to send the measurement results of the energy measuring unit to the OLT connected with the ONU or ONT.

BRIEF DESCRIPTION OF THE DRAWINGS

The accompanying drawings are intended to help understand the present application better and constitute part of this application, but do not constitute improper limitations on the claims of the application.

DETAILED DESCRIPTION

The embodiments below are hereinafter described in detail with reference to the accompanying drawings and embodiments. The exemplary embodiments and description thereof are intended to interpret rather than limit the claims of the application.

Figure 1:
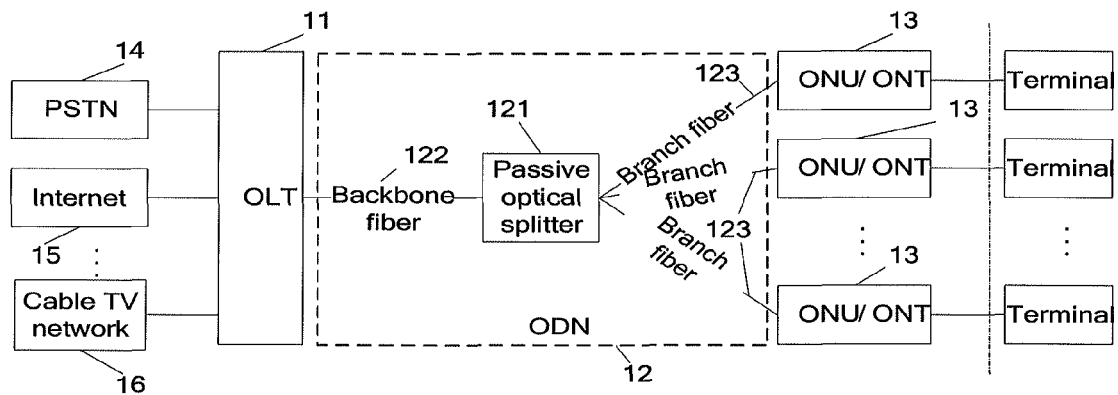
FIG. 1 shows the structure of a PON system in the prior art.

FIG. 1 shows the structure of a PON system. The PON system consists of three parts: an OLT 11 which connects an Optical Distribution Network (ODN) 12 with other networks (such as PSTN 14, Internet 15 and cable TV network 16), an ODN 12, and an ONU/ONT 13. In a PON system, the transmission from an OLT 11 to an ONU/ONT 13 is called downlink, and the reverse transmission is called uplink. Downlink data is broadcast from the OLT 11 to e ach ONU/ONT 13 due to the optical features, and adopts the downlink time division multiplexing (TDM) mode; uplink data of each ONU/ONT 13 is sent through the space allocated by the OLT 11, and adopts the uplink TDM mode. The OLT 11 provides a network-side interface for the PON system to connect one or more ODNs 12; the ODN 12 is a passive optical distribution component which transmits the downlink data of the OLT 11 to each ONU/ONT 13 and transmits the uplink data of multiple ONUs/ONTs 13 together to the OLT 11; the ONU provides a customer side interface for the PON system to be connected with the ODN in the uplink direction. If the ONU supports a user port directly (for example, the Ethernet user port for accessing the Internet on a PC, the ONU is called an ONT. An ODN 12 is generally divided into three parts: passive optical splitter 121, backbone fiber 122, and branch fiber 123. Several embodiments are given below with reference to the system illustrated in FIG. 1.

Figure 2:
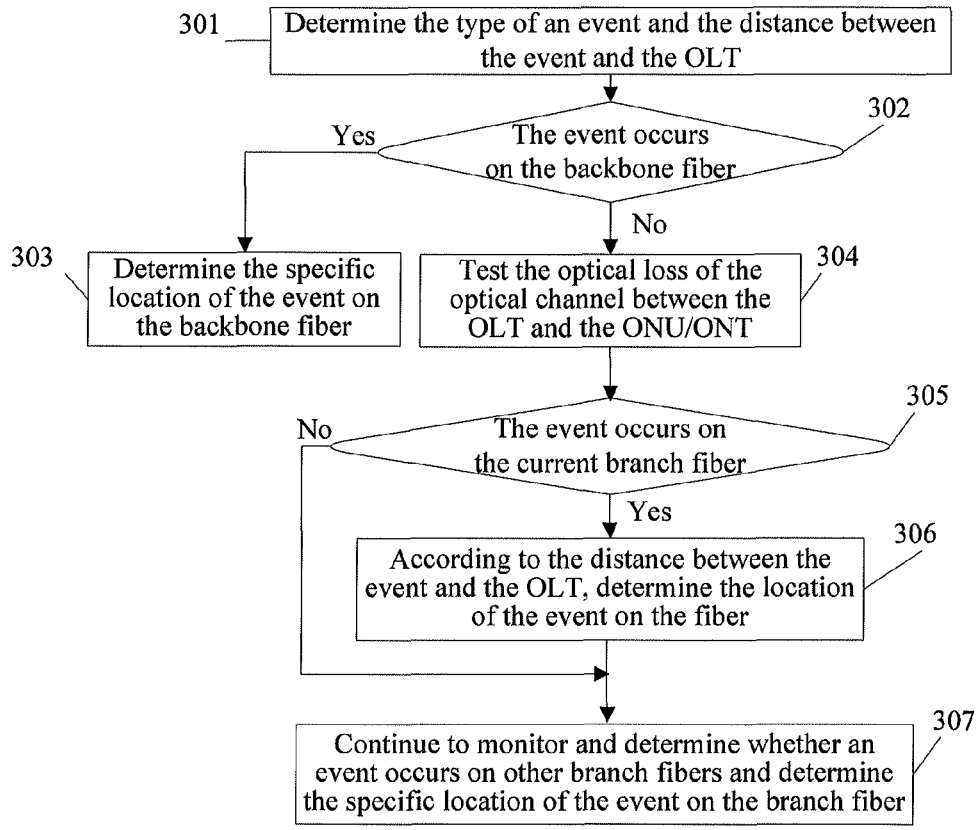
FIG. 2 is a flow chart of a method for locating events of a branch fiber according to a first embodiment.

Embodiment 1:

FIG. 2 is a flow chart of the method for locating events of a branch fiber in an embodiment. The method includes the following steps:

Step 301: Determine the type of an event and the distance between the event and an OLT.

An OTDR, OFDR or other fiber detection device or function may be provided at the OLT side in the PON. Through an OTDR, OFDR or other fiber detection devices, the event is determined, and the distance between the event and the OLT of the OTDR is measured. The function of determining the distance between the event and the OLT may be implemented through a stand-alone device such as an OTDR or OFDR, or other fiber detection devices, or through a module (such as OTDR, OFDR and other fiber detection functions) which is integrated in the OLT and capable of determining the distance between the event and the OLT.

Figure 3:
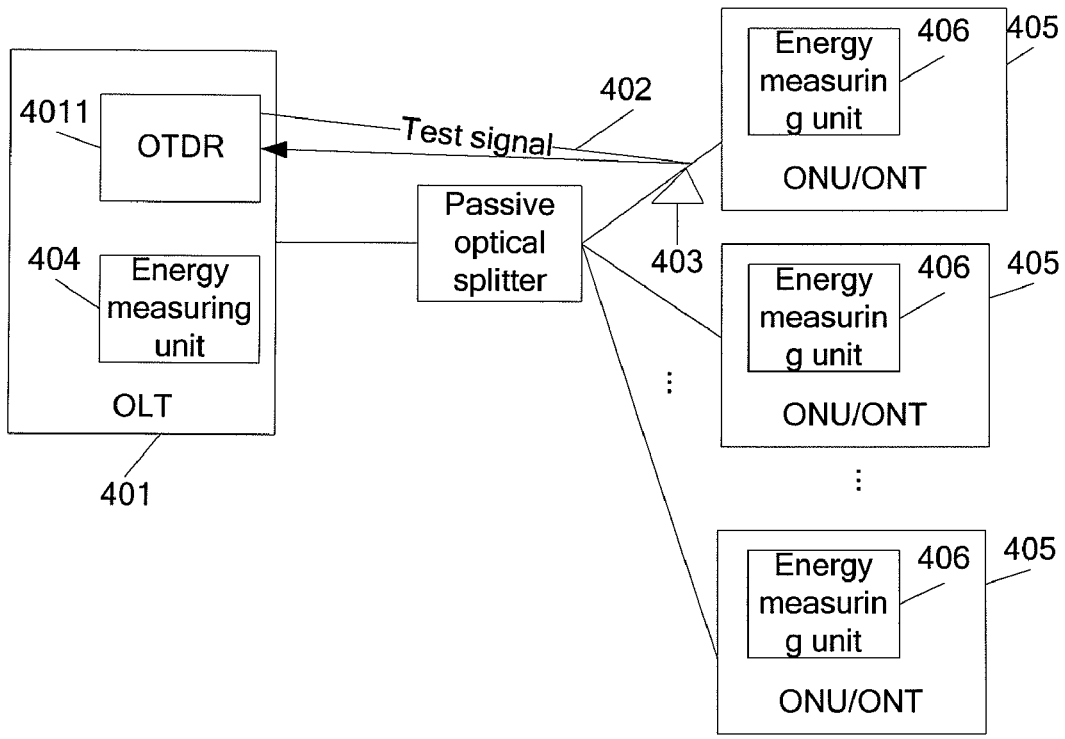
FIG. 3 shows a method for locating branch fiber events through a fiber detection device at the OLT side and an energy measuring unit at the OLT and ONU/ONT side according to the first embodiment.

Take an OTDR as an example. As shown in FIG. 3, a test signal 402 sent by an OTDR 4011 at the OLT 401 side arrives at the event 403, and is reflected back to the OTDR 4011. The OTDR 4011 determines the type and location of the event according to the features (such as signal strength) and delay of the reflected signal. More particularly, the distance between the event and the OLT is determined according to the transmission speed and delay of the test signal. If the fiber detection device is an OFDR or another fiber detection device, the measurement is performed according to the prior art, and is not repeated here any further.

Step 302: Check whether the event occurs on the backbone fiber. If so, the process goes to step 303; otherwise, the process goes to step 304.

If the distance between the event and the OLT is not greater than the distance between the event and the backbone fiber, it is certain that the event occurs on the backbone fiber. Because there is only one backbone fiber, the process goes to step 303, and the specific location of the event on the backbone fiber may be determined according to the prior art.

If the distance between the event and the OLT is greater than the distance between the event and the backbone fiber, it is certain that the event occurs on a branch fiber between the OLT and an ONU or ONT, and the process goes to step 304 to locate the branch fiber where the event occurs.

Step 303: Determine the specific location of the event on the backbone fiber.

The objective of the embodiment is to determine the event on the branch fiber. Steps 302 and 303 may be omitted if it is not necessary to determine whether the event occurs on the backbone fiber and determine the specific location of the event on the backbone fiber. Step 304: Test the optical loss of the optical channel between the OLT and the ONU/ONT.

FIG. 3 illustrates this step. A test device or function for testing the signal energy (expressed by power) is provided on the OLT and each ONU or ONT respectively. This device or function is called an energy measuring unit herein. As shown in FIG. 3, the energy measuring unit 404 at the OLT 401 side measures the power or energy of the test signal sent from the OLT to the branch fiber of an ONU/ONT 405 (the test signal may be the currently transmitted data signal or a signal specific to the test). After receiving the downlink test signal from the OLT (the downlink test signal may be a downlink data signal or another type of signal), the ONU/ONT 405 uses the energy measuring unit 406 at the ONU/ONT 405 side to test the energy (which may be expressed by power) of the received signal and sends the energy test result to the OLT 401 through an uplink channel. Through the energy test result of the energy measuring unit 404 at the local end and the received energy test result uploaded by the ONU/ONT 405, the OLT 401 calculates the optical loss of the optical channel between OLT 401 and ONU/ONT 405. The optical loss may be called downlink optical loss.

The optical loss of the optical channel between OLT 401 and ONU/ONT 405 may also be determined by calculating the optical loss of the optical channel between ONU/ONT 405 and OLT 401, which is called uplink optical loss. The test and calculation methods are the same as the measurement method of the downlink optical loss except that the energy measuring unit 406 at the ONU/ONT 405 side measures the energy of the test signal sent by the ONU/ONT 405 through an uplink channel to the OLT 401, and uploads the energy test result to the OLT 401 through an uplink channel. After the OLT 401 receives the test signal sent by the ONU/ONT 405, the energy measuring unit 404 measures the energy of the uplink test signal received at the OLT 401 side. Afterward, according to the test result of the energy measuring unit 404 and the energy measurement result of test signal received at the transmit end and measured by the ONU/ONT 405, the optical loss of the optical channel between the ONU/ONT 405 and the OLT 401 is calculated, which is called uplink optical loss. The uplink test signal may be an uplink data signal or another type of signal. The optical loss of the optical channel may be calculated at the OLT 401 side or at the ONU/ONT 405 side, and the calculation result is uploaded to the OLT 401. The rules for the ONU/ONT 405 to calculate the optical channel loss are the same as those for the OLT 401 to calculate the optical channel loss except that: the energy of the test signal measured by the OLT needs to be transferred to the ONU/ONT 405 through a downlink channel and the ONU/ONT 405 calculates the optical channel loss.

Generally, when determining the optical loss of the optical channel between the OLT and the ONU or ONT, it is only necessary to test the optical loss in either the uplink or the downlink direction of the optical channel. However, the uplink optical loss is slightly different from the downlink optical loss of the optical channel between an OLT and an ONU/ONT. If very high precision is required, test the uplink optical loss and the downlink optical loss of the optical channel respectively and use an algorithm such as weighted average algorithm to remove the imbalance of the one-way optical loss. In this way, the measurement result of the optical loss of the optical channel is more precise.

Figure 4:
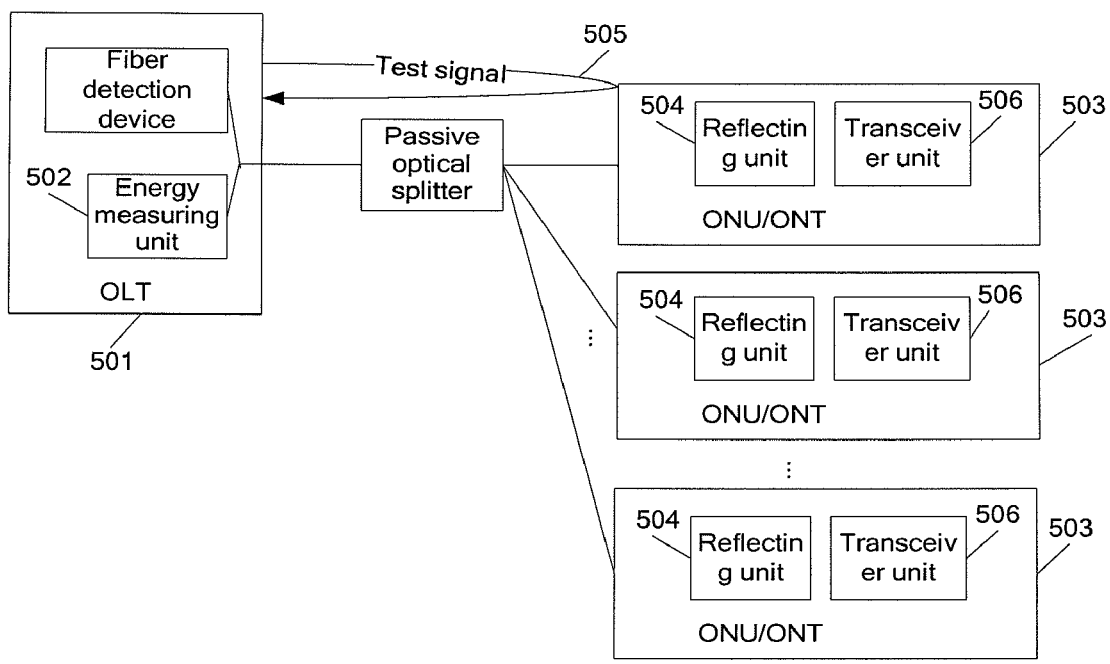
FIG. 4 shows a method for locating branch fiber events through a fiber detection device at the OLT side, an energy measuring unit and a reflection apparatus at the ONU/ONT side according to the first embodiment.

As shown in FIG. 4, the specific method for implementing this step is: an energy measuring unit 502 is arranged on the OLT 501, and a reflecting unit 504 is arranged at the front end of the transceiver unit 506 at each ONU/ONT 503 side respectively. When each reflecting unit 504 is started, the signal arriving at the node is reflected to the signal transmit end in the direction against signal sending. When the reflecting unit 504 is shut down, no reflecting function is supported. The echo loss of the signal caused by the normally working connectors and splicing joints is higher than 40 dB. Therefore, when the reflecting unit 504 is shut down, the impact of the reflection light of the branch fiber onto the reflection signal on the measured branch fiber is ignorable.

As shown in FIG. 4, the OLT 501 sends control information to each ONU/ONT 503 to start the reflecting unit 504 which contains the branch fiber currently to be tested at the ONU/ONT 503 side, and to shut down all other reflecting units 504 at the ONU/ONT 503 side. Moreover, a test signal 505 is sent by the OLT 501 to the measured branch fiber, and the energy measuring unit 502 at the OLT 501 side measures the energy of the test signal sent by the OLT to the branch fiber. The value of the energy is set to Ps. After the test signal 505 arrives at each ONU/ONT 503, only the reflecting unit 504 of the branch fiber to be tested is started. Therefore, only the reflecting unit 504 at the ONU/ONT 503 side on the branch fiber to be measured reflects the test signal 505 to the transmit end OLT 501 in the direction against test signal transmitting. Other reflecting units 504 at the ONU/ONT 503 side do not reflect the test signals. After receiving the reflected test signal 505, the OLT 501 measures the energy of the reflected test signal 505. The value of the energy is set to Pr. By reference to the calculation method in the prior art, according to the energy (Ps) of the sent test signal 505 and the energy (Pr) of the reflected test signal 505, the OLT 501 figures out the optical loss of the optical channel between the OLT 501 and the ONU/ONT 503 on the test branch fiber, including one-way optical loss and two-way optical loss. The one-way optical loss is half of the two-way optical loss. By measuring the two-way optical loss, the imbalance of one-way measurement is removed, and the measurement result of the optical loss of the optical channel is more precise.

The optical loss measurement method shown in FIG. 4 may be extended, namely, the energy measuring unit 502 is arranged at the ONU/UNT side of the PON terminal, the reflecting unit 504 is arranged at the OLT side, and the optical loss to be measured at the ONU/UNT side is returned to the OLT side. However, this measurement method is generally more costly than the foregoing measurement method.

Step 305: Check whether the event occurs on the current branch fiber. If so, the process goes to step 306; otherwise, the process goes to step 307.

As shown in FIG. 3, after obtaining the optical loss of the optical channel (associating a branch fiber) between the OLT 401 and the ONU/ONT 405, according to the relationship between the optical loss of the optical channel and the normal loss (normal one-way or two-way loss when the fiber is not faulty) of the optical channel, judge whether the event occurs on the current branch fiber: if the optical loss is greater than the normal loss, the event occurs on the current branch fiber and the process goes to step 306; if the optical loss is equal to the normal loss, the event does not occur on the current branch fiber, and the process goes to step 307.

Step 306: Determine the location of the event on the fiber according to the distance between the event and the OLT.

After the branch fiber where the event occurs is determined, the location of the event on the branch fiber can be determined according to the distance between the event and the OLT determined in step 301.

Step 307: Continue to monitor and determine whether an event occurs on other branch fibers and determine the specific location of the event on the branch fiber.

This step may be performed by reference to steps 304-306, and is not repeated here any further.

According to the principles of this embodiment, the process of determining the location of the event on the branch fiber may be: determining the optical loss of the optical channel first; according to the optical loss of the optical channel, judging whether an event occurs on the optical channel; and if so, determining the distance between the event and the OLT, thus determining the specific location of the event on the branch fiber.

Even if the data at the ONU or ONT side on a branch fiber cannot be uploaded because the fiber has a too large loss or is cut, the event of the branch fiber can also be located through an exclusive method according to the method of this embodiment.

In the final analysis, through the method of this embodiment, the event can be located on the branch fiber by: providing an OTDR, OFDR or other fiber detection devices or functions at the OLT side of the optical network office end; arranging a reflecting apparatus at the ONU or ONT side to reflect the measurement signals back to the OLT side of the central office end; or arranging an energy measuring unit at the ONU or ONT side to measure the energy of the test signal. The location of the event does not require the costly OTDR, OFDR or other fiber detection devices at the ONU or ONT side. Therefore, the method of this embodiment slashes the network monitoring cost as compared with the second method in the prior art. Meanwhile, the method of this embodiment imposes no restriction on the fiber in the network, namely, it imposes no requirement on the cabling of each branch fiber (for example, length of the fiber) in the PON. Therefore, this method is much more practicable than the first method in the prior art.

Figure 5:
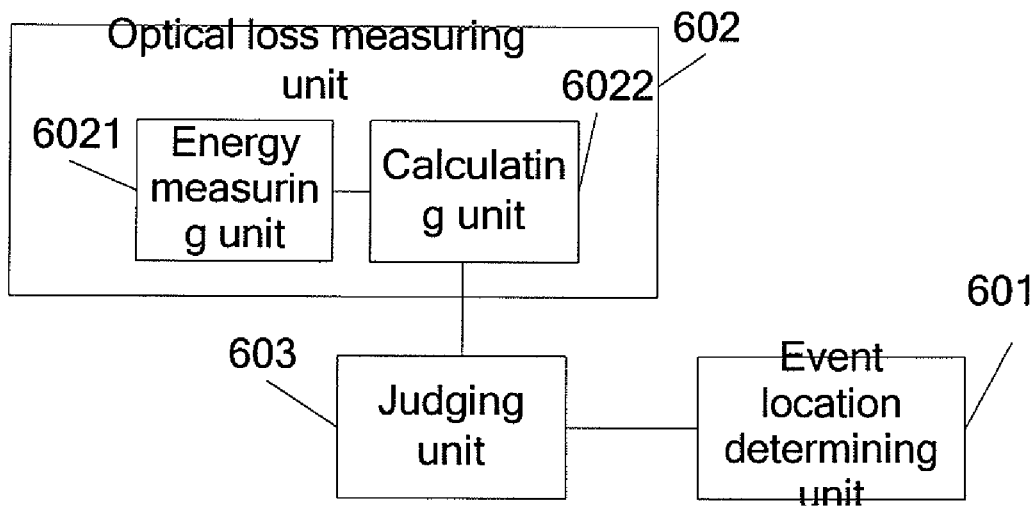
FIG. 5 shows an OLT structure provided in a second embodiment.

Embodiment 2:

FIG. 5 shows an OLT structure provided in an embodiment (corresponding to the method in FIG. 4). As shown in FIG. 5, the OLT includes:

an optical loss measuring unit 602, adapted to measure the optical loss of the optical channel between the OLT and the ONU or ONT at the peer end of the measured branch fiber. The optical loss determining unit 602 may include:

an energy measuring unit 6021, adapted to measure the energy of the test signal, which includes the energy of the test signal sent from the OLT to the ONU or ONT and the energy of the test signal reflected from the ONU or ONT;

a calculating unit 6022, adapted to determine the optical loss of the optical channel between the OLT and the ONU or ONT according to the energy of the test signal measured by the energy measuring unit 6021 and the energy of the reflected test signal.

This OLT further includes:

a judging unit 603, adapted to judge whether an event occurs on the branch fiber according to the relationship between the optical loss and the normal loss of the optical channel determined by the optical loss measuring unit 602. If the optical loss is greater than the normal loss, the event occurs on the current branch fiber; if the optical loss is equal to the normal loss, the event does not occur on the current branch fiber; and an event location determining unit 601, adapted to determine the distance between the event and the OLT, and, when the judging unit determines that the event occurs on the branch fiber, determine the location of the event on the fiber according to the distance between the event and the OLT.

The event location determining unit 601 may be an OTDR, OFDR or another fiber detection device. First, the event location determining unit determines the type of the event and the distance between the event and the OLT. If the event location determining unit 601 determines that the distance between the event and the OLT is smaller than or equal to the length of the backbone fiber, the event occurs on the backbone fiber; otherwise, the event is on the branch fiber connected with the backbone fiber.

In the case that the event is on the branch fiber connected with the backbone fiber, if the judging unit 603 determines that the event is on the current branch fiber, the judging unit 603 determines the location of the event on the fiber according to the distance between the event and the OLT determined by the event location determining unit 601.

Figure 6:
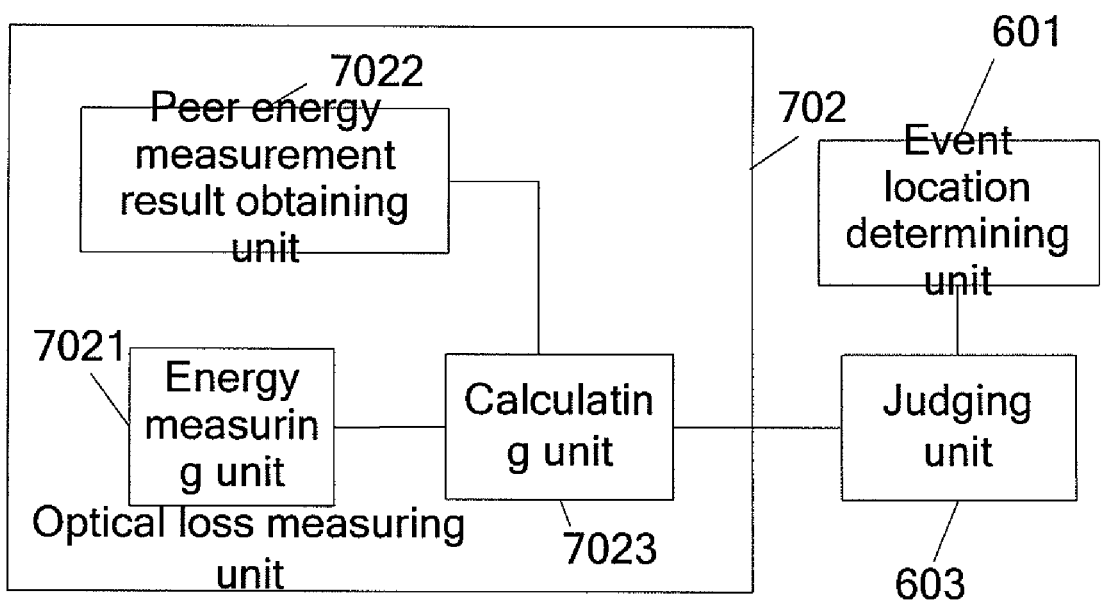
FIG. 6 shows another OLT structure provided in the second embodiment.

FIG. 6 shows another OLT structure provided in an embodiment (associating the method in FIG. 3). As shown in FIG. 6, the OLT differs from the OLT shown in FIG. 5 in an optical loss measuring unit 702. The optical loss measuring unit 702 here includes: an energy measuring unit 7021, adapted to measure the energy of the test signal, which includes the energy of the test signal sent from the OLT to the ONU or ONT at the peer end of the measured branch fiber, and/or the energy of the test signal sent from the ONU or ONT at the peer end of the measured branch fiber to the OLT;

a peer energy test result obtaining unit 7022, adapted to obtain the energy of the test signal measured at the peer end of the measured branch fiber, where the energy of the test signal is the energy of the test signal sent from the OLT to the ONU or ONT at the peer end of the measured branch fiber, or the energy of the test signal (at the ONU or ONT side) sent from the ONU or ONT at the peer end of the measured branch fiber to the OLT;

an energy measuring unit may be arranged on the ONU or ONT at the peer end of the measured branch fiber in order to test the energy value of the test signal arriving at the ONU or ONT or measure the energy of the test signal (on the ONU or ONT) between the ONU or ONT and the OLT at the peer end of the measured fiber. The test results are uploaded to the peer energy test result obtaining unit 7022 of the OLT. The peer energy test result obtaining unit 7022 knows the energy value measured on the ONU or ONT at the peer end of the measured branch fiber according to the uploaded results;

Even if the measurement data at the ONU or ONT side on the branch fiber cannot be uploaded to the OLT at the transmit end because the fiber has a too large loss or is cut, the event of the branch fiber can also be located through an exclusive method by using the OLT in this embodiment.

a calculating unit 7023, adapted to determine the optical loss of the optical channel between the OLT and the ONU or ONT according to the energy of the sent test signal and the energy of the test signal received by the ONU or ONT, or determine the optical loss of the optical channel between the OLT and the ONU or ONT according to the energy of the received test signal and the energy of the test signal sent by the ONU or ONT.

Therefore, when the event is not on the backbone fiber, the OLT provided by this embodiment can use the optical loss measuring unit 702 to determine the optical loss of the optical channel between this OLT and the ONU or ONT at the peer end of the measured branch fiber. Afterward, the judging unit 603 compares the optical loss result obtained by the optical loss measuring unit 702 with the normal loss to judge whether the event occurs on the currently measured branch fiber. If so, the event location determining unit 601 determines the distance between the event and the OLT first, and then locates the event on the branch fiber according to the determined distance. As compared with the OLT in the prior art, the OLT in this embodiment supports the function of locating the event on a branch fiber, and is capable of monitoring and locating an event at the OLT side.

Figure 7:
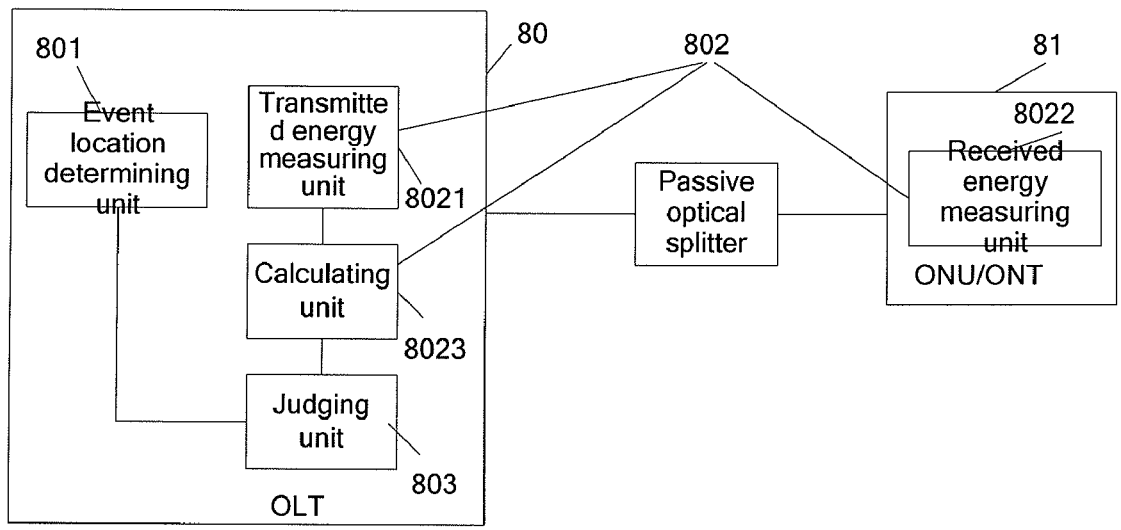
FIG. 7 shows the first optical network structure provided in a third embodiment.

Embodiment 3:

FIG. 7 shows an optical network structure provided in this embodiment. As shown in FIG. 7, the optical network includes an OLT 80, an ONU/ONT 81, and a passive optical splitter. More particularly, the optical network includes:

an optical loss measuring unit 802, adapted to measure the optical loss of the optical channel between the OLT and the ONU or ONT at the peer end of the measured branch fiber. In an optical network, the optical loss measuring unit 802 may include:

a transmitted energy measuring unit 8021, arranged at the OLT 80 side and adapted to measure, at the transmit end OLT 80, the energy of the test signal sent to the optical channel between the OLT 801 and the ONU/ONT 81 at the peer end of the measured branch fiber;

a received energy measuring unit 8022, arranged on the ONU/ONT 81 at the peer end of the measured branch fiber and adapted to measure the energy of the test signal at the receive end. After obtaining the measurement data, the received energy measuring unit 8022 uploads the measurement result or processed (for example, averaged) measurement result through an uplink channel to the calculating unit 8023 on the OLT 80 which sends the test signal;

a calculating unit 8023, arranged at the OLT 80 side and adapted to determine the optical loss of the optical channel between the OLT 80 and the ONU/ONT 81 according to the energy of the optical test signal measured by the transmitted energy measuring unit 8021 and the energy of the optical test signal which is returned by the received energy measuring unit 8022 and measured at the receive end ONU/ONT 81;

a judging unit 803, arranged on the OLT 80 and adapted to judge whether an event occurs on the branch fiber according to the relationship between the optical loss determined by the optical loss measuring unit 802 and the normal loss. If the optical loss is greater than the normal loss, the event occurs on the current branch fiber; if the optical loss is equal to the normal loss, the event does not occur on the current branch fiber; and an event location determining unit 801, arranged at the OLT 80 side and adapted to determine the distance between an event and the OLT, and, when the judging unit determines that the event occurs on the branch fiber, determine the location of the event on the fiber according to the distance between the event and the OLT.

First, the event location determining unit 801 determines the distance between the event and the OLT where the event location determining unit is located. Generally, in order to reduce costs, the event location determining unit 801 is arranged at the OLT 80 side. The event location determining unit 801 may be an OTDR, OFDR or another fiber detection device, which is adapted to determine the type of an event and the distance between the event and the OLT 80. If the event location determining unit 801 determines that the distance between the event and the OLT 80 is less than or equal to the length of the backbone fiber, the event occurs on the backbone fiber; otherwise, the event is on the branch fiber connected with the backbone fiber.

In the case that the event is on the branch fiber connected with the backbone fiber, if the judging unit 803 determines that the event is on the currently measured branch fiber, the judging unit 801 determines the location of the event on the fiber according to the distance between the event and the OLT 80 determined by the event location determining unit 801.

Figure 8:
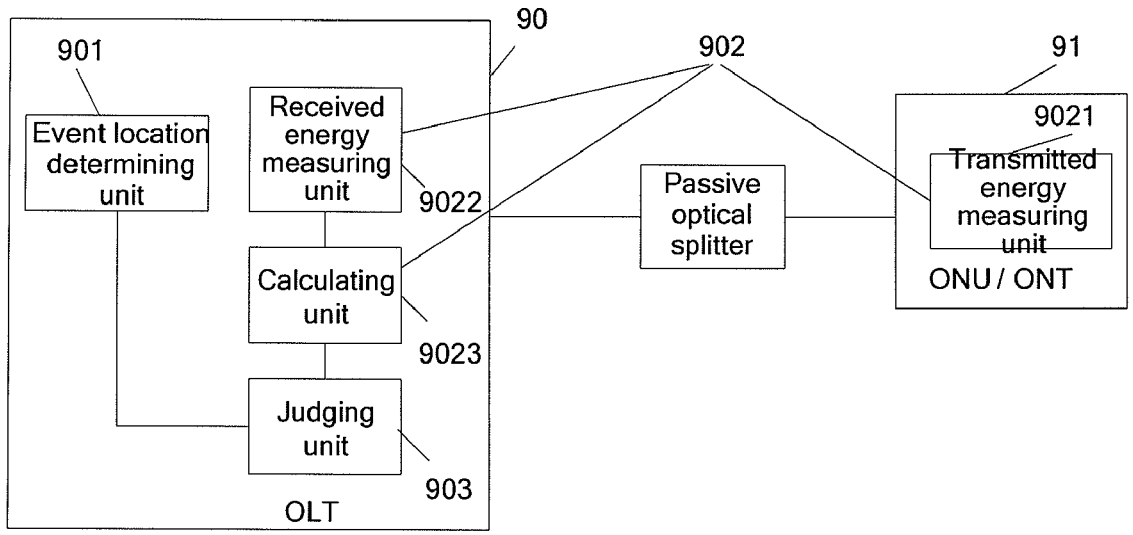
FIG. 8 shows the second optical network structure provided in the third embodiment.

Moreover, as shown in FIG. 8, the optical loss measuring unit 902 in an optical network may include:

a transmitted energy measuring unit 9021, arranged at the ONU/ONT 91 side and adapted to measure at the transmit end ONU/ONT 91 the energy of the test signal sent to the optical channel between the ONU/ONT 91 and the OLT 90 at the peer end of the measured branch fiber. After obtaining the data, the transmitted energy measuring unit 9021 uploads the measurement result to the calculating unit 9023 at the OLT 90 side through an uplink channel.

a received energy measuring unit 9022, arranged on the OLT 90 at the peer end of the measured branch fiber and adapted to measure the energy of the test signal at the receive end; and a calculating unit 9023, arranged at the OLT 90 side and adapted to determine the optical loss on the fiber link where the branch fiber is located according to the energy of the optical test signal measured by the transmitted energy measuring unit 9021 and the energy of the optical test signal measured by the received energy measuring unit 9022 at the receive end OLT 90.

Moreover, the optical loss measuring unit can be implemented not only through a structure shown in FIG. 7 and FIG. 8, but also through the following structure: the transmitted energy measuring unit and the received energy measuring unit are arranged at both sides (OLT side and ONU or ONT side) of the measured branch fiber respectively, and the calculating unit is arranged at the ONU or ONT side. After the calculating unit figures out the optical loss of the optical channel between the OLT and the ONU or ONT according to the measurement results of the transmitted energy measuring unit and the received energy measuring unit, the calculating unit at the ONU or ONT side sends the calculation results back to the OLT side through an uplink channel. The judging unit 803 and the event location determining unit 804 at the OLT side judge and locate the event according to the optical channel loss.

Even if the measurement result or calculation result at a side on the branch fiber cannot be uploaded to the peer end because the fiber has a too large loss or is cut, the event of the branch fiber can also be located through an exclusive method by using the optical network in this embodiment.

Figure 9:
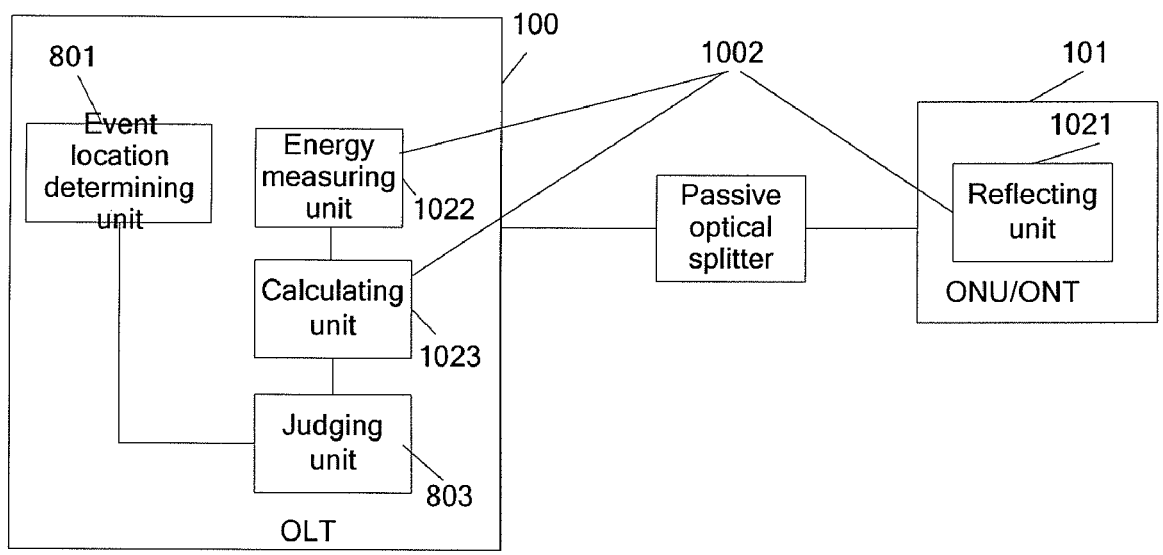
FIG. 9 shows the third optical network structure provided in the third embodiment.

FIG. 9 shows another optical network structure provided in an embodiment. This optical network structure differs from the optical network structure shown in FIG. 7 about the internal structure of the optical loss measuring unit. As shown in FIG. 9, the optical loss measuring unit 1002 includes:

a reflecting unit 1021, arranged on the ONU/ONT 101 at the peer end of the measured branch fiber and adapted to reflect the test signal arriving at the ONU/ONT 101 back to the transmit end OLT 100;

an energy measuring unit 1022, arranged on the OLT 100, and adapted to measure the energy of the test signal at the OLT 100 side. The energy of the test signal includes the energy of the test signal sent to the optical channel between the OLT 100 and the ONU/ONT 101 and the energy of the test signal reflected by the reflecting unit 1021 back to the OLT 100. The energy measuring unit 1022 may be implemented through an ordinary energy test unit or through an Optical Loss Test Set (OLTS);

a calculating unit 1023, arranged on the OLT 100 and adapted to determine the optical loss of the optical channel between the OLT 100 and the ONU/ONT 101 according to the energy of the sent test signal measured by the energy measuring unit 1022 and the energy of the reflected test signal.

other units, which are similar to the units in FIG. 7 and not repeated here any further.

It is thus evident that the optical network in this embodiment is capable of locating an event on a branch fiber at the OLT side as compared with the prior art. Moreover, the optical network in this embodiment imposes no special restriction on the length of the branch fiber in the network, thus featuring highly practicable. Meanwhile, in this network, the costly event location determining unit (which may be implemented through an OTDR, OFDR or other fiber detection devices) needs to be arranged only at the OLT side, which slashes the network cost.

Figure 10:
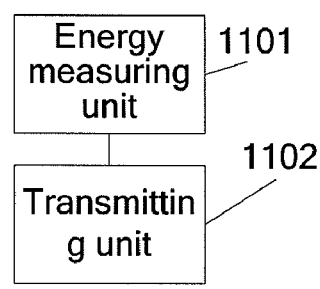
FIG. 10 shows the structure of an ONU/ONT provided in a fourth embodiment.

Embodiment 4:

FIG. 10 shows the structure of an ONU or ONT provided in this embodiment. As compared with the prior art, the ONU or ONT in this embodiment further includes:

an energy measuring unit 1101, adapted to measure the energy of the test signal, which includes the energy of the test signal sent from the ONU or ONT to the OLT at the peer end of the measured branch fiber or the energy of the test signal sent from the OLT at the peer end of the measured branch fiber to the ONU or ONT; and a sending unit 1102, adapted to send the measurement result of the energy measuring unit 1101 to the OLT at the peer end of the fiber. Therefore, the OLT can calculate the optical loss of the optical channel according to the measurement result obtained by the energy measuring unit 1101 at the ONU or ONT side, the event on the branch fiber can be located at the OLT side, and the network monitoring cost is reduced.

Embodiment 5:

The structure of the ONU or ONT in this embodiment is illustrated by the ONU or ONT 101 in FIG. 9. Compared with the prior art, this ONU or ONT further includes:

a reflecting apparatus 1021, adapted to reflect the test signal back to the transmit end OLT of the test signal in the direction against test signal sending, namely, the OLT side at the peer end of the measured branch fiber. As a result, the OLT can calculate the optical loss of the optical channel by measuring the energy of the test signal reflected to the OLT in view of the energy of the test signal at the time of being sent, the event on the branch fiber can be located at the OLT side, and the network monitoring cost is reduced.

Given below are several supplementary notes to the embodiment. First, the normal loss mentioned in the foregoing embodiments has different meanings, depending on the actual conditions. In theory, a normal loss is a normal loss value or a normal loss range which allows for the factors such as measurement errors, or a loss value measured when the fiber is normal or a loss range which allows for the factors such as measurement errors.

Besides, when the uplink or downlink data signal is used as a test signal, namely, the optical loss of the optical channel in the uplink and downlink directions is calculated through the transmitted or received energy of the uplink or downlink data signal measured at the OLT or ONU or ONT, the attenuation of the optical signal with a longer wavelength is less than the attenuation of the optical signal with a shorter wavelength because the wavelength of the data signal varies in the uplink and downlink directions in a single-fiber bidirectional PON system and certain events (for example, serious bending of fibers) on the fiber impose different impact on different wavelengths. Therefore, it is also appropriate to determine whether an event (such as bending) occurs on an optical channel between an OLT and an ONU or ONT according to the change of optical attenuation in the uplink and downlink directions (namely, the relationship between the change amount of the optical loss of the uplink optical channel and the change amount of the optical loss of the downlink optical channel). To sum up, the technical solution described are capable of monitoring and locating a network event at the OLT side and locating an event on a branch fiber, thus slashing the costs and being more practicable. Meanwhile, by using the technical solutions described, the event of the branch fiber can also be located through an exclusive method even if the data at the ONU or ONT side on a branch fiber cannot be uploaded because the fiber has a too large loss or is cut.

Detailed above are a method for locating events of a branch fiber, an optical network, and a network device. Although reference is made to some exemplary embodiments, the claims in the application are not so limited. It is apparent that those skilled in the art can make various modifications and variations to what is described without departing from the spirit and scope of the claims. The claims shall cover the modifications and variations provided that they fall in the scope of protection defined by the following claims or their equivalents.

What is claimed is:

1. A method for locating fiber events, comprising:
determining a distance between an event and an Optical Line Terminal (OLT);
determining whether the event occurs on a backbone fiber in a passive optical network (PON) according to the distance between the event and the OLT;
if it is determined that the event does not occurs on the backbone fiber, measuring optical loss of an optical channel between the OLT and an Optical Network Unit (ONU) or Optical Network Terminal (ONT), wherein the ONU or ONT is located at a peer end of a branch fiber in the PON; and
determining whether the event occurs on the branch fiber according to a relationship between the measured optical loss and a predetermined optical loss of the optical channel, and, if so, determining a location of the event on the branch fiber according to the distance between the event and the OLT;
wherein the optical loss comprises downlink optical loss of the optical channel, and the measuring of the optical loss of the optical channel between the OLT and the ONU or ONT comprising:
sending, by the OLT, a downlink test signal to the ONU or ONT through the optical channel, and measuring, by the OLT, a transmitted power of the downlink test signal sent to the ONU or ONT;
measuring, by the ONU or ONT, a received power of the downlink test signal sent from the OLT when the downlink test signal is received at the ONU or ONT, and uploading, by the ONU or ONT, the received power of the downlink test signal to the OLT through the optical channel; and
calculating, by the OLT, the downlink optical loss of the optical channel based on the transmitted power measured by the OLT and the received power uploaded by the ONU or ONT;
wherein the measured optical loss further comprises uplink optical loss, and the measuring of the optical loss of the optical channel between the OLT and an ONU or ONT further comprising:
sending, by the ONU or ONT, an uplink test signal to the OLT through the optical channel; measuring, by the ONU or ONT, a transmitted power of the uplink test signal sent to the OLT; and uploading, by the ONU or ONT, the transmitted power of the test signal to the OLT through the optical channel;
receiving, by the OLT, the uplink test signal sent from the ONU or ONT through the optical channel;
receiving, by the OLT, the transmitted power of the uplink test signal sent from the ONU or ONT;
measuring, by the OLT, a received power of the uplink test signal when the uplink test signal is received at the OLT;
calculating, by the OLT, the uplink optical loss of the optical channel between the OLT and the ONU or ONT based on the transmitted power uploaded by the ONU or ONT and the received power measured by the OLT.

2. The method of claim 1, wherein the uplink optical loss of the optical channel is slightly different from the downlink optical loss of the optical channel.

3. The method of claim 2, wherein the measuring optical loss of an optical channel between the OLT and an ONU or ONT further comprising:
performing a weighted average algorithm on the uplink optical loss and the downlink optical loss to obtain an averaged optical loss of the optical channel, wherein it is determined that the event occurs on the branch fiber when the optical loss is greater than the predetermined optical loss.

4. An optical network, comprising an Optical Line Terminal (OLT), an Optical Distribution Network (ODN) and a plurality of Optical Network Units (ONUs) or Optical Network Terminals (ONTs), wherein the ODN comprises a passive optical splitter, the passive optical splitter being connected to the OLT through a backbone fiber, and connected to the ONUs or ONTs through branch fibers;

wherein the OLT is adapted to:
  determine a distance between an event and the OLT,
  determine whether the event occurs on the backbone fiber according to the distance between the event and the OLT,
  measure optical loss of an optical channel between the OLT and an ONU or ONT connected to one of the branch fibers if it is determined that the event does not occurs on the backbone fiber,
  judge whether the event occurs on the branch fiber according to a relationship between the measured optical loss and a predetermined optical loss of the optical channel,
  determine a location of the event on the branch fiber according to the distance between the event and the OLT when it is judged that the event occurs on the branch fiber; wherein the predetermined optical loss is a normal one-way loss or a two-way loss when the branch fiber is not faulty;

wherein the ONU or ONT comprises a first received energy measuring unit adapted to measure a received power of a downlink test signal sent from the OLT when the downlink test signal is received at the ONU or ONT, and upload the received power of the downlink test signal to the OLT through the optical channel; and the OLT comprises a first transmitted energy measuring unit adapted to measure a transmitted power of the downlink test signal sent to the ONU or ONT;

a peer energy test result obtaining unit adapted to obtain the received power of the downlink test signal uploaded by the ONU or ONT through the optical channel; and a calculating unit adapted to calculate a downlink optical loss of the optical channel between the OLT and the ONU or ONT based on the transmitted power and the received power of the downlink test signal;

wherein the ONU or ONT further comprises a second transmitted energy measuring unit adapted to measure a transmitted power of an uplink test signal sent to the OLT from the ONU or ONT, and upload the transmitted power of the uplink test signal to the OLT through the optical channel; and the OLT further comprises a second received energy measuring unit adapted to measure a received power of the uplink test signal sent from the ONU or ONT when the downlink test signal is received at the OLT;

wherein the peer energy test result obtaining unit of the OLT is further adapted to obtain the transmitted power of the uplink test signal uploaded by the ONU or ONT; and the calculating unit is further adapted to calculate an uplink optical loss of the optical channel between the OLT and the ONU or ONT based on the transmitted power and the received power of the uplink test signal.

* * * * *